United States Patent [19]

Burgess et al.

[11] Patent Number: 4,587,598
[45] Date of Patent: May 6, 1986

[54] UNIVERSAL HEADLIGHT

[75] Inventors: Bruce E. Burgess, Silver Spring; Joel C. Gorick, Potomac, both of Md.

[73] Assignee: Candlepower Inc., Rockville, Md.

[21] Appl. No.: 673,723

[22] Filed: Nov. 21, 1984

[51] Int. Cl.⁴ .............................................. F21V 33/00
[52] U.S. Cl. ...................................... 362/72; 362/306; 362/287
[58] Field of Search ................ 362/72, 420, 306, 287, 362/419, 365, 430

[56] References Cited

U.S. PATENT DOCUMENTS

| | | | |
|---|---|---|---|
| 1,647,149 | 11/1927 | Ryan | 362/287 |
| 1,648,198 | 11/1927 | Ryan | 362/287 |
| 2,137,092 | 11/1938 | Michel | 362/306 |
| 2,344,716 | 3/1944 | Mears | 362/306 |
| 2,762,908 | 9/1956 | Gaither | 362/306 |
| 2,920,188 | 1/1960 | Clayton | 362/365 |
| 4,356,536 | 10/1982 | Funabashi | 362/72 |

Primary Examiner—Carl Stuart Miller
Attorney, Agent, or Firm—Larson and Taylor

[57] ABSTRACT

A universal headlight reflector member for mounting a headlight to a variety of headlight mountings of different mid-sized motorcycles is disclosed. The reflector member includes a circular rim to which a left flange, a right flange, a top flange, and a bottom flange are attached. These flanges are particularly configured to provide the universal mounting of the headlight. Preferably, the diameter of the rim is about 162 mm.

8 Claims, 5 Drawing Figures

UNIVERSAL HEADLIGHT

FIELD OF THE INVENTION

The present invention relates to a universal headlight which is adapted to fit many motorcycles of the mid-size range.

BACKGROUND OF THE INVENTION

In most motor vehicles, including cars, trucks, and many motorcycles, manufacturers have constructed a uniform system of headlights, allowing users of all different makes and models of a particular vehicle to obtain replacement headlights readily and cheaply. This is not the case with regard to motorcycles in the mid-size range, from about 250–550 cc. In this size range, motorcycles produced by the four major manufacturers, Honda, Suzuki, Yamaha and Kawasaki, have headlight mountings which differ significantly from each other. Consequently, headlights designed for use in one brand of motorcycle will not fit the brand of a competitor in this size range. As a result, it is often difficult to obtain replacement headlights for a particular mid-size motorcycle, and one is often at the mercy of the individual manufacturers who monopolize their own model's headlights and who can command high prices for these simple items.

In addition, parts suppliers must stock all four different headlights, taking up valuable storage space. As a result, for a low volume sales item such as a halogen headlight, it is not economical to stock all four sized headlights. Consequently such headlights are not readily available. A need therefore exists for a headlight which can fit the mountings on a number mid-size motorcycles from the major manufacturers, one that would be more economical for parts suppliers to stock, and thus more economical for the consumer to obtain.

SUMMARY OF THE INVENTION

Accordingly, an object of the present invention is to provide a universal motorcycle headlight, one that is capable of fitting any of the four different headlight mountings found on mid-size motorcycles produced by the above-mentioned major manufacturers.

It is also an object of the present invention to provide a headlight which can be used as a replacement headlight for many mid-size motorcycles, one that can be obtained more readily and more economically than present replacement headlights.

It is further an object of the present invention to provide a replacement motorcycle headlight which uses a halogen lamp as the light source.

These and other objects of the invention are obtained through the provision of a universal motorcycle headlight with attachment means making it possible to fit it into any of the presently used headlight mountings on mid-size motorcycles produced by the major manufacturers.

The headlight according to the present invention comprises a conventional front lens and a reflector member having a circular rim which holds the front lens to the reflector member. Four flanges are attached to this rim in order to adapt the headlight to fit any of the headlight mountings on mid-size motorcycles produced by the above-mentioned four major manufacturers.

A left flange is attached to the left side of the rim, and extends rearwardly first, then outwardly at an angle of approximately 45 degrees. This flange has two apertures, both capable of receiving an adjustment screw from an appropriate headlight mounting.

A right flange is attached at the right side of the rim, extends rearwardly, and is rectangularly shaped to be received by a mating receiver from an appropriate headlight mounting.

Top and bottom flanges are attached to the top and bottom of the rim, respectively, and extends rearwardly. Both flanges are of equal size, and both contain an aperture to allow the receipt of a mounting screw from an appropriate headlight mounting such as to allow adjustment of the headlight about a vertical axis.

In a preferred embodiment, the light source used is a world standard halogen lamp. The use of the universal headlight makes the provision of a halogen lamp more economical, as it lowers the cost of the headlight. The halogen lamps are desirable as the light source as they are widely manufactured and readily available for users of the universal headlight.

Other features of the present invention are stated in or apparent from the detailed description of a presently preferred embodiment of the invention found hereinbelow.

DETAILED DESCRIPTION OF THE PREFERRED EMBODIMENT

Figure 2:
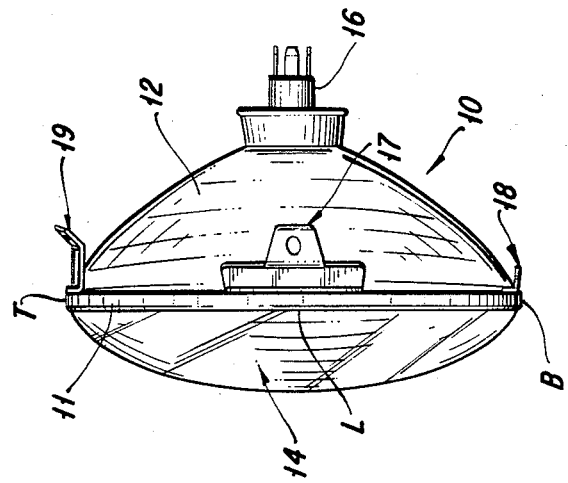
FIG. 2 is a top view of the headlight of the present invention.
Figure 1:
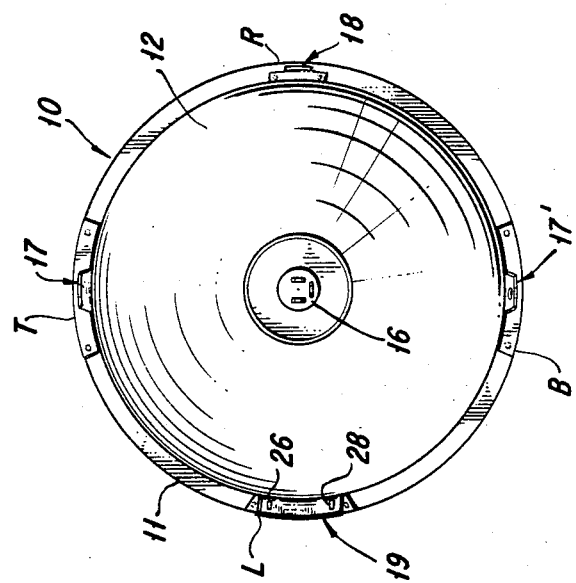
FIG. 1 is a rear perspective view of the headlight reflector member of the present invention showing all four of the flanges.
Figure 4:
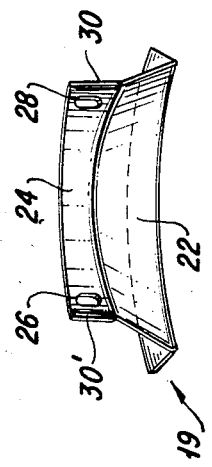
FIG. 4 is a rear perspective view showing the left flange of the present invention.
Figure 5:
FIG. 5 is a rear perspective view showing the right flange of the present invention.
Figure 3:
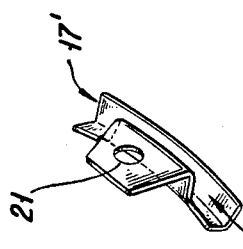
FIG. 3 is a bottom perspective view showing the bottom flange of the present invention.

With reference now to the drawings in which like numerals represent like elements throughout the several views, a preferred embodiment of the headlight 10 of the present invention is depicted in FIGS. 1 and 2. Headlight 10 shown comprises a reflector member 12 and a front lens 14. Front lens 14 is held in place by a circular rim 11 integrally formed with reflector member 12. A halogen lamp (not shown) sits at the center of reflector member 12 facing front lens 14. A socket means 16 extends rearwardly through reflector member 12 to hold the lamp in place. Headlight 10 also includes a top flange 17, a bottom flange 17', a right flange 18, and a left flange 19. These flanges are depicted individually in FIGS. 3–5. Flanges 18 and 19 are shown in respective FIGS. 5 and 4. Bottom flange 17', usable for attachment to bottom of the mounting, is shown in FIG. 3.

Left flange 19, attached to a left side L of rim 11, has a rearward portion 22 extending rearwardly. An outward portion 24 then extends outwardly at an angle of approximately 45 degrees from rearward portion 22. Outward portion 24 has two apertures 26 and 28, each capable of receiving a respective adjustment screw from the headlight mounting of a Honda or a Kawasaki mid-size motorcycle. Outward portion 24 additionally has small lip portions 30 and 30' immediately adjacent to each aperture, at the longitudinal sides of outward portion 24, to assist in keeping an associated screw nut (not shown) in place.

Right flange 18, which is attached to a right side R of rim 11, has a rearward extending portion 32 which is sized to be received into the mating receiver of either a Yamaha or Suzuki mid-sized motorcycle headlight mounting. It is preferred that right flange 18 be rectangular in shape, but any desired configuration which will allow the flange to fit the appropriate mating receiver can be employed.

Top flange 17 and bottom flange 17', which are fixed to a respective top T and a bottom B of casing 10 are identical. Bottom flange 17' is depicted in greater detail in FIG. 3. As shown bottom flange 17' extends rearwardly, and contains an aperture 21 for receiving a mounting screw (not shown) to attach headlight 10 to the bottom of a headlight mounting of a Honda or Kawasaki motorcycle. The rearward extension of this flange forms a channel 40 with respect to the rim so as to allow clearance for the mounting clip of the headlight mounting of a Yamaha or a Suzuki motorcycle. Top flange 17 is similarly mounted to the top of the headlight mounting and together top flange 17 and bottom flange 17' allow movement of headlight 10 about a vertical axis.

The above-mentioned flanges are conveniently attached to rim 11 by spot welding, but other conventional attaching methods can also be used.

Headlight 10 described above fits into any of the four headlight mountings used on the large variety mid-size motorcycles made by the major manufacturers. In Kawasaki motorcycles, the mounting includes attachment means at the top and bottom of the mounting, which receive top and bottom flanges 17, 17' of headlight 10 of the present invention. To affix headlight 10 to such mounting, top and bottom flanges 17 and 17' are lined up with the mounting so that mounting screws through both flanges 17 and 17' secure headlight 10 to the mounting. The Kawasaki mounting apparatus also contains an adjustment screw which projects through a nut located above lower aperture 28 and next to lip portion 30 in left flange 19 on headlight 10 of the present invention. The adjustment screw extends through lower aperture 28 of headlight 10 and through a corresponding aperture on the mounting such that movement of the adjustment screw allows for side to side adjustment of headlight 10.

The mounting means in Honda motorcycles is very similar to that in Kawasaki motorcycles. The only difference is that the aperture on the mounting which allows for side to side adjustment is located circumferentially upward approximately 3 cm. Thus, affixing of headlight 10 of the present invention to a Honda mounting involves the same steps as described in the Kawasaki mounting, except that now upper aperture 26 of left flange 19 receives the adjustment screw.

The universal headlight 10 also fits into either a Yamaha or Suzuki headlight mounting conveniently. These mountings involve a series of clips which are snapped down on the rim of headlight 10 to hold headlight 10 in place. The only flange of headlight 10 which is involved in the attachment to these two mountings is right flange 32 which fits into a mating piece on the side of the Yamaha or Suzuki mounting. This mating piece (not shown) is received in a flange on the mounting (also not shown) which mounting flange allows for side to side adjustment of headlight 10.

It is also important to point out that one of the clips in the Yamaha and Suzuki mountings snaps down on the bottom portion of the headlight. It is for this reason that the bottom flange 17' contains channel 40 so as to allow clearance for this clip.

The only difference between the Yamaha and Suzuki headlight mountings is in size. The Yamaha mounting holds a headlight roughly 163 mm in diameter, and the Suzuki mounting is designed to encase a headlight of approximately 158 mm in diameter. Universal headlight 10 of the present invention has a diameter of roughly 162 mm which has been found to be able to fit inside both the mountings of the Yamaha and Suzuki motorcycles.

Although the present invention has been described with respect to an exemplary embodiment thereof, it will be understood by those of ordinary skill in the art that variations and modifications may be effected within the scope and spirit of the present invention.

We claim:

1. A universal headlight reflector member for mounting a headlight to a variety of headlight mountings of a variety of different mid-size motorcycles, said headlight reflector member comprising:

a circular rim having a top, a bottom, a left side, and a right side;

a left flange attached to the left side of said rim, said left flange including a rearward portion and an outward portion, said outward portion extending approximately 45 degrees outwardly from said rearward portion and including a first aperture located adjacent the left side and a second aperture spaced downwardly from said first aperture, both of said apertures being located in said outward portion and being adapted for receiving an appropriate adjustment screw for adjusting the side to side mounting of said rim in an appropriate headlight mounting;

a right flange attached to the right side of said rim, said right flange extending rearwardly and being sized to be received in a appropriate mating receiver in an appropriate headlight mounting; and a top flange and a bottom flange attached to the respective top and bottom of said rim, said top and bottom flanges extending rearwardly and containing an aperture therein for receiving a mounting screw for attaching said rim to an appropriate headlight mounting so as to be adjustable about a vertical axis.

2. A universal headlight as claimed in claim 1 wherein said outward portion includes a lip adjacent each said aperture of said left flange.

3. A universal headlight as claimed in claim 2 wherein said rearward portion of said left flange is trapezoidally shaped.

4. A universal headlight as claimed in claim 1 wherein said right flange is rectangularly shaped.

5. A universal headlight as claimed in claim 4 wherein said top and bottom flanges are trapezoidally shaped.

6. A universal headlight as claimed in claim 5 wherein said top and bottom flanges extend rearwardly so as to form a channel between the rearward extension and the rim.

7. A universal headlight as claimed in claim 1 wherein all of said flanges are spot welded to said rim.

8. A universal headlight as claimed in claim 1 wherein the diameter of said circular rim is about 162 mm.

* * * * *